(12) United States Patent
Reid

(10) Patent No.: US 6,229,522 B1
(45) Date of Patent: May 8, 2001

(54) APPARATUS AND METHOD FOR PRODUCING A REPRESENTATION OF A RASTERIZED IMAGE AND DETECTING A RASTERIZED IMAGE

(76) Inventor: Don G. Reid, 1605 Scenic Loop, Round Rock, TX (US) 78681

( * ) Notice: Subject to any disclaimer, the term of this patent is extended or adjusted under 35 U.S.C. 154(b) by 0 days.

(21) Appl. No.: 09/256,133

(22) Filed: Feb. 24, 1999

Related U.S. Application Data

(60) Provisional application No. 60/076,749, filed on Mar. 4, 1998, now abandoned.

(51) Int. Cl.$^7$ .................................................... G09G 5/36
(52) U.S. Cl. ........................ 345/138; 348/907; 725/22
(58) Field of Search .................................. 345/138, 443; 348/590, 715, 700, 907; 358/908; 382/184, 193, 194; 725/9, 22, 32, 34–36

(56) References Cited

U.S. PATENT DOCUMENTS

| | | | |
|---|---|---|---|
| 3,893,075 | * 7/1975 | Orban et al. | 340/172.5 |
| 4,230,990 | * 10/1980 | Lert, Jr. et al. | 455/67 |
| 5,333,091 | * 7/1994 | Iggulden et al. | 360/14.1 |
| 5,600,380 | * 2/1997 | Patel et al. | 348/614 |

* cited by examiner

*Primary Examiner*—Matthew Luu
*Assistant Examiner*—J. F. Cunningham
(74) *Attorney, Agent, or Firm*—Shaffer & Culbertson, L.L.P.; Russell D. Culbertson

(57) ABSTRACT

A representation of an image is made from a set of image line signals. The method includes producing a plurality of image component values. Each image component value comprises a value derived from least one selected image line signal included in the set of image line signals. The various image component values are arranged into and ordered sequence and this ordered sequence provides a representation of the image with which the set of image line signals is associated.

20 Claims, 8 Drawing Sheets

APPARATUS AND METHOD FOR PRODUCING A REPRESENTATION OF A RASTERIZED IMAGE AND DETECTING A RASTERIZED IMAGE

This application claims the benefit of prior United States provisional patent application No. 60/076,749 entitled METHOD FOR CAPTURING AND DETECTING RASTERIZED IMAGES, filed Mar. 4, 1998, now expired.

TECHNICAL FIELD OF THE INVENTION

This invention relates to rasterized imaging systems and, more particularly, to an apparatus and method for producing a representation of a rasterized image. The representation of the rasterized image allows the image to be detected in an incoming video signal.

BACKGROUND OF THE INVENTION

The images which are displayed on cathode ray tube (CRT) display devices such as traditional television monitors and other types of monitors are commonly rasterized images. A rasterized image is made up of a plurality of discrete lines. For example, an NTSC rasterized image contains 525 lines divided into two fields. This type of divided image is referred to as an interlaced image. Each of these fields are used alternately to produce an image on the display device. The display device uses a time varying voltage signal to produce each image line. Each such time varying voltage signal representing a line of a rasterized image will be referred to herein as an image line signal. The image line signals are received serially one after the other, and the display device produces each image line similarly one after the other. Once one image is produced, the process starts over again to produce the next interlaced image. The speed at which the individual image line signals are received and the speed at which the corresponding image lines are written onto the display device is fast enough that the viewer perceives only the overall image. The individual images themselves are each replaced by the succeeding image fast enough that the process appears continuous.

There are many situations in which it is desirable to detect a particular image in an incoming video signal. When recording a commercial television broadcast for example, it may be desirable to detect an advertisement and prevent the advertisement from being recorded along with desired programming. The ability to detect a particular image in an incoming stream of image signals may also be useful in monitoring security or surveillance video feeds. Changing images in the incoming stream of image signals indicates motion.

There have been a number of attempts to provide a reliable system for detecting advertisements in video signals. Prior detection systems fall into the following categories:

(1) systems which detect an audio and/or video fade as a precursor to an advertisement;
(2) systems which sample the image signal frequently during each line of an image, quantizing the sample and comparing the quantized values to previously stored values;
(3) systems which process image samples to isolate an object in the image, and then scan for the isolated object in the same lines of an image being tested;
(4) systems which sample the image signals at multiple points between the start and end of an image and construct a series of digital values indicative of the image;
(5) systems which use embedded information in the non-displayed image signals or associated audio signals to identify images or types of images;
(6) systems which detect specific changes in image fields, possibly over long periods of time, by matching data samples from two distinct fields; and
(7) systems which detect images by applying neural network recognition techniques to data obtained by sampling frequently over a line of an image.

There are number of problems associated with the prior methods used to detect an image in an incoming stream of image signals. Systems which rely on video and audio fading are not reliable because such fading may not occur between multiple advertisements or between advertisements and program segments. Systems which rely on embedded information in the incoming image signals are unreliable because they depend upon the cooperation of the entity transmitting the signal. Sampling techniques generally assume that the image signal is identical for an image used to produce a stored representation and the current incoming image. In fact, signal noise and horizontal shifting of the image signals caused by signal re-synchronization at local stations may result in significantly different sampled values for the same image. Furthermore, many of the current image detection techniques are expensive to implement relative to the cost of a television set or VCR. The prior art devices require high-speed circuitry to facilitate the required real-time comparison between the incoming image and stored images. The prior art systems also require large amounts of memory to store images to be detected.

SUMMARY OF THE INVENTION

It is an object of the invention to provide an apparatus and method for detecting an image in a stream of image line signals which make up an incoming rasterized image. Another object of the invention is to provide an apparatus and method for producing an image representation which may be used in detecting the image in an incoming stream of image line signals.

These objects are accomplished by sampling image line signals in a novel fashion to provide a unique representation of a particular image in an incoming stream of image line signals. According to the invention, a set of image line signals from a rasterized image is converted into an ordered sequence of line-based image component values. The ordered sequence of image component values provides a representation of the image. This representation may be stored and later compared with similarly produced representations of incoming images. A match between a stored image representation and a representation of an incoming image indicates that the incoming image is the same as the image represented by the stored representation. Alternatively, where the incoming stream of images comprises images from a surveillance camera, for example, a change in the image representation indicates motion in the image which is captured by the camera.

According to the invention, each image line signal is summed or integrated to produce an image line value representative of the signal. This value is preferably converted into a digital form and used alone or with other digitized image line values to produce an image component value. The resulting image component value comprises one of the values in the ordered sequence of values which makes up the desired image representation. The order of the values in the sequence is determined by the received order of the image line signal or signals used to produce the particular value. The various image component values in the ordered sequence may comprise a single image line value or an average of two or more such values. Averaging two or more image line values has the advantage of reducing the storage space required for storing the image representation and also the advantage of reducing the effects of random noise in the incoming image line signals.

Detecting an image in an incoming stream of image line signals requires four steps. First, an image to be detected is processed to produce an ordered sequence of image component values providing a representation of the image. This step may be referred to as capturing the representation of the image to be detected. The representation of the image to be detected is then stored in a suitable storage device. Next, the incoming stream of image line signals is continually processed in the same fashion as the stored image representation. Thus, an ordered sequence of image component values is produced for each incoming image. Finally, the ordered sequence of image component values produced from the signals for each incoming image is compared to the stored ordered sequence of the image component values produced from the image to be detected. A match between the image representation produced from the incoming image signals and the stored image representation indicates that the incoming image is the same as the image represented by the stored ordered sequence.

As used in this disclosure and the following claims, the term "match" is used to indicate a defined degree of similarity. Image component values of the incoming and stored image representations need not be identical in order for them to be considered a match. Some degree of variation in image component values produced for a particular image is to be expected. The uniqueness in the image representation is contained in the sequence of ordered values versus the exact match of the values in the sequence.

The ordered sequence of image component values comprising the representation of an image to be detected may be produced locally or may be produced by an apparatus according to the invention at some remote site. Remotely produced image representations may be transferred to the local image detection apparatus by any suitable means. For example, remotely produced image representations may be downloaded over a communication facility such as a regular telephone line. Locally produced image representations according to the invention may be produced in response to a start or capture signal which may be manually provided by the user.

When the invention is used to detect an incoming image, the system invokes a control signal upon occurrence of a match between an incoming image representation and a stored image representation. The control signal may be used for any number of purposes. For example, when the stored image representation represents an image at the beginning of a television advertisement, the control signal may be used to control a recording device, such as a VCR for example, preventing the recording device from recording the advertisement along with the desired programming. If a continuous match is expected, a mismatch between an incoming image representation and a previously stored image representation may also be used to produce a control signal. For example, a system according to the invention may invoke a control signal upon the occurrence of an image representation mismatch to alert security personnel of motion in an area under video surveillance.

The set of image line signals used to create an image representation according to the invention may comprise any one of many possible sets of image line signals in an incoming image. Since each image line signal is converted to a single value, even if each individual line in a rasterized image is used to produce an ordered sequence according to invention, the resulting ordered sequence represents a relatively small amount data compared to the amount data required to reproduce the image. Thus, an image representation according to the invention requires relatively little storage space. Furthermore, only relatively few image line signals need to be included in a set in order for the resulting image representation to provide a sufficient signature of the image to accurately detect the image or detect a change in the image. Also, the process of comparing image representations according to the invention is comparatively fast due to the small amount of data included in an image representation. Where a number of different images are to be detected, the stored representations may be sorted on any values in the ordered sequence. This sorting also speeds the process of comparing image representations.

The apparatus for producing an image representation according to the invention preferably includes capture initiating means for providing a capture signal, and a storage device for storing an ordered sequence of image component values (that is, an image representation) produced in response to the capture signal. The apparatus also includes an image processing arrangement for receiving the set of image line signals associated with an image and producing the ordered sequence of image component values. The preferred apparatus further includes a comparison arrangement for comparing the ordered sequence of image component values with at least one previously stored ordered sequence, and preferably, with a database of previously stored ordered sequences. The comparison may be to determine whether the current ordered sequence either matches a stored ordered sequence or does not match a stored ordered sequence. In either case, a control signal device is included for generating a control signal in response to a desired result of the comparison.

In the preferred form of the invention the signal processing arrangement includes a circuit for summing each image line signal in the received set of image line signals to produce a summed signal. An analog-to-digital converter preferably converts each summed signal to a digital representation which may be stored as a value in the ordered sequence of image component values or averaged with other values to produce an averaged value in the ordered sequence. A timing control system preferably detects a horizontal synchronization signal between the incoming image line signals and uses the detected synchronization signals to control the operation of the analog-to-digital converter and summing device. A suitable processor controls the operation of the storage device and also performs the comparisons between a representation of an incoming image and a stored image representation.

The process for producing a representation of an image and for detecting an incoming image according to invention provides a number of advantages over prior art systems. First, the data required to represent an image is greatly reduced because each image is represented by an ordered sequence of values produced from lines of the incoming signal. Also, summing each incoming line signal reduces the effects of noise and minimizes variations caused by phase shifts in the incoming signal. The small amount of data required for representing an image allows comparisons of images to proceed very rapidly. Thousands of comparisons are possible during the period of one field of a received image. The image representation database also takes up significantly less memory than required for other image detection systems. Also, the present system reduces the risk of failing to detect images due to poor correlation between sample values because relatively few values are used to represent an image.

These and other objects, advantages, and features of the invention will be apparent from the following description of the preferred embodiments, considered along with the accompanying drawings.

DESCRIPTION OF THE PREFERRED EMBODIMENTS

Figure 1:
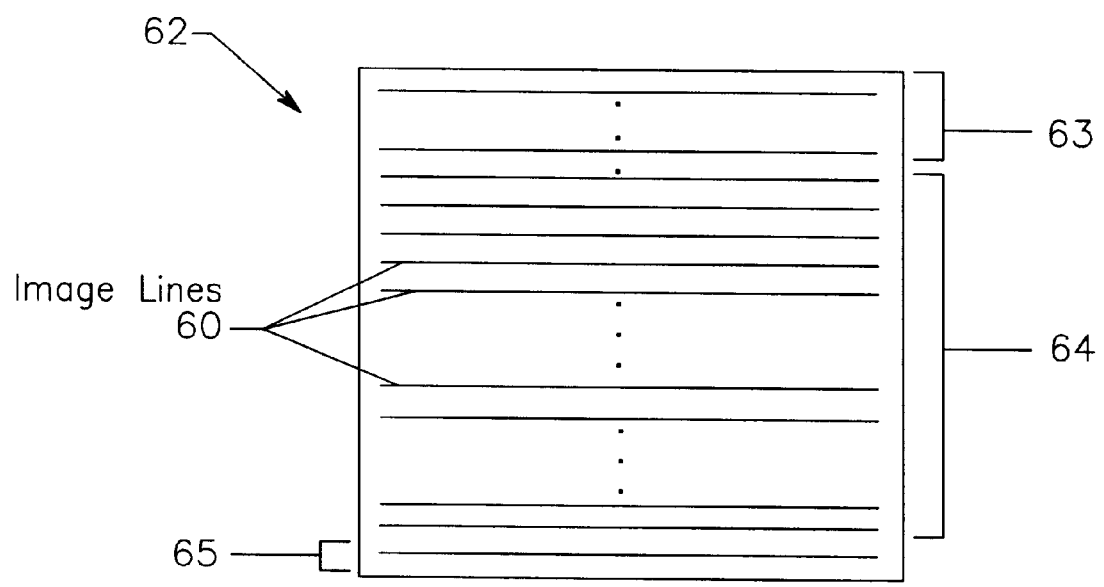
FIG. 1 is a diagrammatic representation of a field of image lines which make up a rasterized image.

FIG. 1 illustrates a number of image lines 60 which are included in an NTSC format field 62 containing a rasterized image (the image itself is not shown). Although the NTSC format is illustrated for purposes of describing invention, those skilled in the art will appreciate that invention is not limited to image signals in the NTSC format. Referring to FIG. 1, the image lines 60 are included in region 64 of field 62. The field 62 also includes two other regions, regions 63 and 65. Regions 63 and 65 each include synchronization information and other information which is not part of the actual image used by the invention. Region 64 contains the actual image used by the invention. The image is made up of the discrete image lines 60.

Figure 3A:
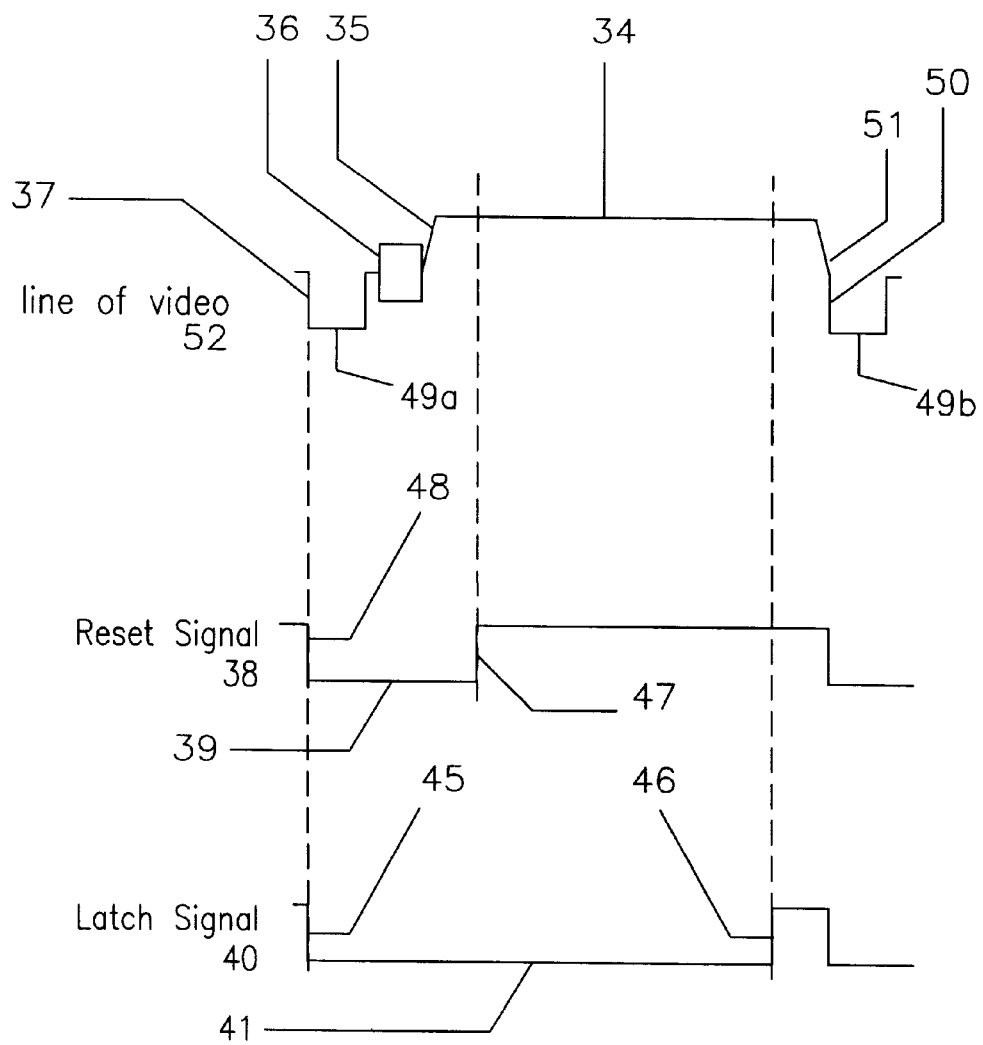
FIG. 3A is a timing diagram showing the relative timing of an image line signal and reset and latch signals used by the apparatus shown in FIG. 2.
Figure 3B:
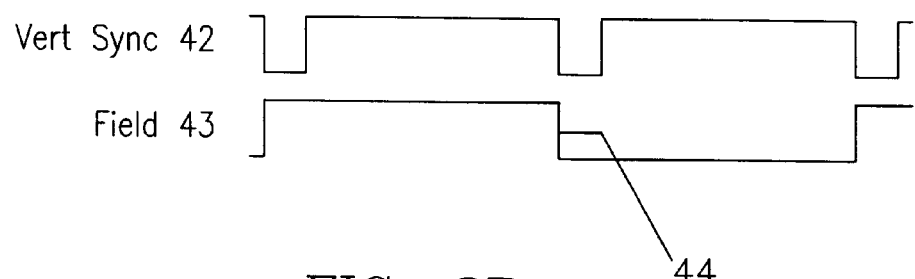
FIG. 3B is a timing diagram showing the relationship between a field signal and vertical synchronization signal received by the form of the invention shown in FIG. 2.

Each image line 60 in region 64 shown in FIG. 1 is produced from an image line signal 52 shown in FIG. 3. Image line signal 52 includes a color burst section 36 and an active video signal 34 comprising a time varying voltage signal. The color burst section 36 of image line signal 52 is not used by the invention. Each active video signal 34 and its associated color burst section 36 is separated from other image line signals in an incoming stream of signals by horizontal synchronization (horizontal sync) signals 49a and 49b.

An incoming stream of signals used to produce an image on a suitable display device (not shown) such as a television monitor, for example, comprises a continuous stream of image line signals 52 transmitted serially one after the other and separated by horizontal sync signals 49a and 49b. The horizontal sync signal 49a occurs at the start of one line and signal 49b occurs at the start of the next line of data. A first image line signal 52 in the incoming stream is written to a display device to produce an image line 60 and then the immediately following image line signal is written to produce the next image line and so on until the entire desired image is produced. Immediately after a first image is produced on the display device using the incoming image line signals, the first image is replaced by a second image which is similarly produced from the incoming series of image line signals 52. The process of writing and rewriting individual images produces the moving images we perceive on the display. A television image is comprised of two fields. Each field forms an image that contains one-half of the lines of a complete image frame. The first field displays odd-numbered lines, while the second field displays even-numbered lines. Every other field overwrites itself.

Figure 2:
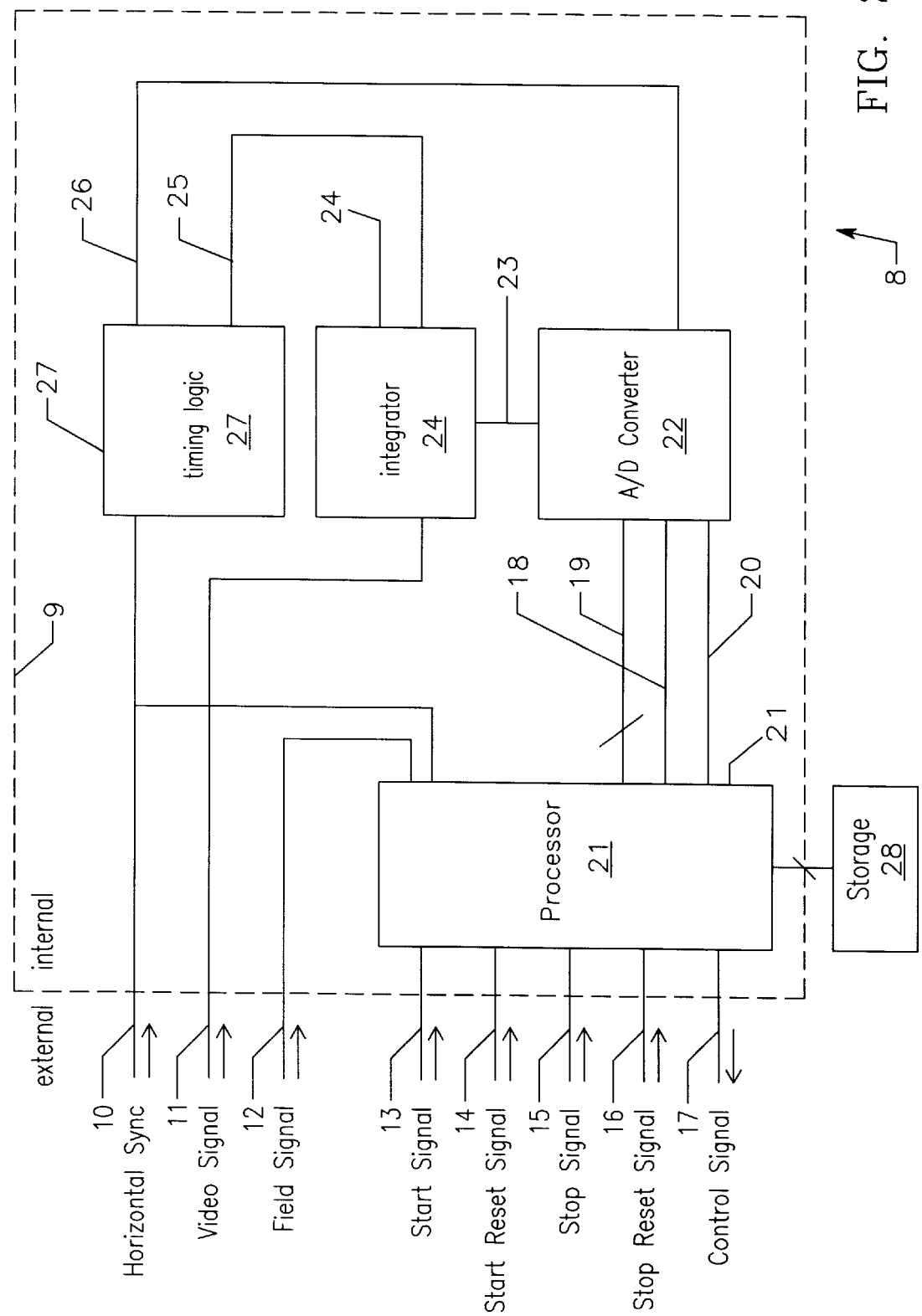
FIG. 2 is a diagrammatic representation of an apparatus embodying the principles of the invention for producing an image representation and detecting an image received in a stream of image signals.

FIG. 2 illustrates the preferred form of an apparatus embodying the principles of the invention. The apparatus 8 shown FIG. 2 operates both to produce an image representation according to the invention and to detect an image produced from an incoming stream of image line signals 52. The apparatus 8 includes an image processing arrangement 9 and a storage device 28. Image processing arrangement 9 receives image line signals (52 in FIG. 3) associated with a particular incoming image and produces from the image line signals an ordered sequence of image component values. This ordered sequence of image component values provides a representation of the image with which the received image line signals 52 are associated. Storage device 28 is available for storing an ordered sequence of image component values produced by processing arrangement 9. By comparing an ordered sequence produced from an incoming signal with a stored ordered sequence, the apparatus 8 can determine if the image from which the incoming ordered sequence was produced is the same as the image from which the stored ordered sequence was produced. In other words apparatus 8 allows an image to be detected by converting it into an image representation comprising an ordered sequence of component values, and comparing it to a similarly produced ordered sequence previously produced from the same image.

Referring still to FIG. 2, the illustrated form of the invention utilizes a standard NTSC composite video signal received on line 11, a field signal received on line 12, a horizontal sync signal received on line 10. The field signal on line 12 comprises a signal used to indicate the odd or even field in a transmission comprising an interlaced image and changes state at the start of each field. A start signal applied through line 13 and a stop signal applied through 15 are used in capturing a desired image for storage as an ordered sequence of image component values. The principal output signals of apparatus 8 are a control signal provided on line 17, a start reset signal on line 14, and a stop reset signal on line 16. The field signal on line 12 and horizontal sync signal on line 10 utilized by the illustrated form of the invention are generally available in a television or VCR environment. Alternatively, the signals may be produced from the composite video signal using commercially available integrated circuits such as the ELANTEC 4583 integrated circuit, for example.

In the form of the invention illustrated in FIG. 2, image processing arrangement 9 includes a processor 21, an integrator 24, an analog-to-digital converter 22, and a timing arrangement 27. Integrator 24 preferably comprises a suitable circuit for integrating or summing at least a portion of the active video signal 34 included in an image line signal 52 shown in FIG. 3A. This summed signal is supplied to analog-to-digital converter 22 through line 23. Analog-to-digital converter 22 converts the summed signal produced by integrator 24 to a quantized or digital representation for use in producing the desired ordered sequence of image component values. Timing arrangement 27 controls the operation of integrator 24 and analog-to-digital converter 22 by providing a reset signal through reset line 25 and latch signal through latch line 26. The timing of the latch signal 40 and reset signal 38 with respect to the image line signal 52 is shown in FIG. 3A. Timing arrangement 27 develops the latch signal 40 and reset signal 38 using the horizontal sync signals 49a and 49b included in the incoming image signals.

Processor 21 collects digital representations of the summed signals from analog-to-digital converter 22 and arranges the collected values as an ordered sequence of values. This ordered sequence of image component values then provides a representation of the image from which the values were produced. Processor 21 may then store the ordered sequence in storage device 28 for future reference in detecting that same image in an incoming stream of image signals. Storage device 28 preferably has sufficient capacity to store a desired database of image data. Each image will nominally comprise 32 to 52 bytes of data as will be explained below. In the illustrated form of the invention, processor 21 stores an ordered sequence in response to a start or capture signal supplied though the start line 13 as will be discussed below.

A comparison means is also implemented in the processor 21 through software instructions. In the comparison operation the processor 21 compares an ordered sequence of image component values (that is, an image representation) produced from an incoming set of image signals with a stored ordered sequence of image component values (a stored image representation). Where the comparison results in a match, or a mismatch in some applications of invention, the processor 21 produces a control signal at control signal line 17. The control signal line 17 may be used for example to control a VCR in image detection applications of the invention, or to control an alarm in security applications.

In order to quantize just the appropriate section of the image line signal 52, timing arrangement 27 must control the integrator 24 and A/D converter 22. As shown in FIG. 3, the integration begins after the start of the active video signal 35 and the analog to digital conversion is triggered just prior to the occurrence of the next horizontal sync pulse 49b which terminates the active video signal for the particular line.

Referring to FIGS. 2 and 3A, the timing arrangement 27 utilizes horizontal sync pulses 49a and 49b on line 10 to produce the reset signal 38 on reset line 25 and latch signal 40 on latch line 26. The reset signal 38 controls integrator 24 while the latch signal 40 controls the A/D converter 22. As shown in FIG. 3, reset signal 38 transitions active low with the leading edge 37 of horizontal sync pulse 49a. Reset signal 38 returns to the inactive state 47 after the leading edge 35 of active video signal 34 in response to a time out signal generated by timing arrangement 27. While in the active low state, the reset signal 38 discharges an integration capacitor (not shown) of integrator 24 establishing a uniform starting voltage where integration of each active video signal begins. The timing between the leading edge 35 of active video 34 and the trailing edge 47 of the reset signal 38 should be no more than a few percent of the total period of the active video signal 34.

Referring still to FIGS. 2 and 3A, the integration value produced by integrator 24 must be sampled by A/D converter 22 prior to the leading edge 50 of next horizontal sync signal 49b. Otherwise, the integration capacitor will be reset by the active portion 39 of reset signal 38. To accomplish this timing, latch signal 40 goes active on the leading edge 37 of the leading horizontal sync pulse 49a, and is active for the majority of the duration of the active video signal 34. On the trailing edge 46 of latch signal 40, A/D converter 22 samples the integrated or summed signal voltage appearing on line 23, and isolates this signal as the input to the A/D converter. A/D converter 22 then converts the summed signal voltage to a digital representation. Thus the timing between the trailing edge 46 of latch signal 40 and leading edge 50 of the next horizontal sync signal 49b must be greater than the time required for the A/D converter 22 to isolate its voltage input. With the proper timing, each active video signal 34 of each image line signal 52 is quantized in this manner.

Referring to FIG. 2, when quantization is complete, A/D converter 22 latches the resulting quantized data onto data bus 19 and transfers the value to processor 21 preferably using two asynchronous hand-shake lines: data_ready 20 and data_read 18. At the end of conversion, the signal on data_ready line 20 becomes active. This active data_ready signal interrupts processor 21 which reads the value on data bus 19. When processor 21 finishes reading the data on bus 19, it resets the latched A/D converter data outputs by applying a signal on data_read line 18. Once A/D converter 22 is reset, it awaits the next transition of the latch signal 40 to the inactive state at trailing edge 46 (FIG. 3) to start the conversion of the summed voltage of the active video portion 34 of the next image line signal 52.

The conversion and data transfer operation should occur in less time than the active period of the latch signal 40. Since the latch signal active period can be almost sixty microseconds, approximately the period of the horizontal line sweep in an NTSC signal, data conversion and transfer is easily accomplished. All of the lines of the active video region 64 (FIG. 1) are quantized in this manner and presented to processor 21. The data may be used or discarded as described below.

The processor 21 shown in FIG. 2 is programmed with interrupt service routines for the field input signal received on line 12, the horizontal sync signals received on line 10, and the data_ready signal on line 20. Data_read signal on line 18, the control signal on control line 17, the start reset signal on line 14, and stop reset signal on line 16 are each generated by the processor 21 under program control. Data on data bus 19, the signal on start line 13, and the signal on stop line 15 are read by the processor 21 as a result of program execution.

Figure 4:
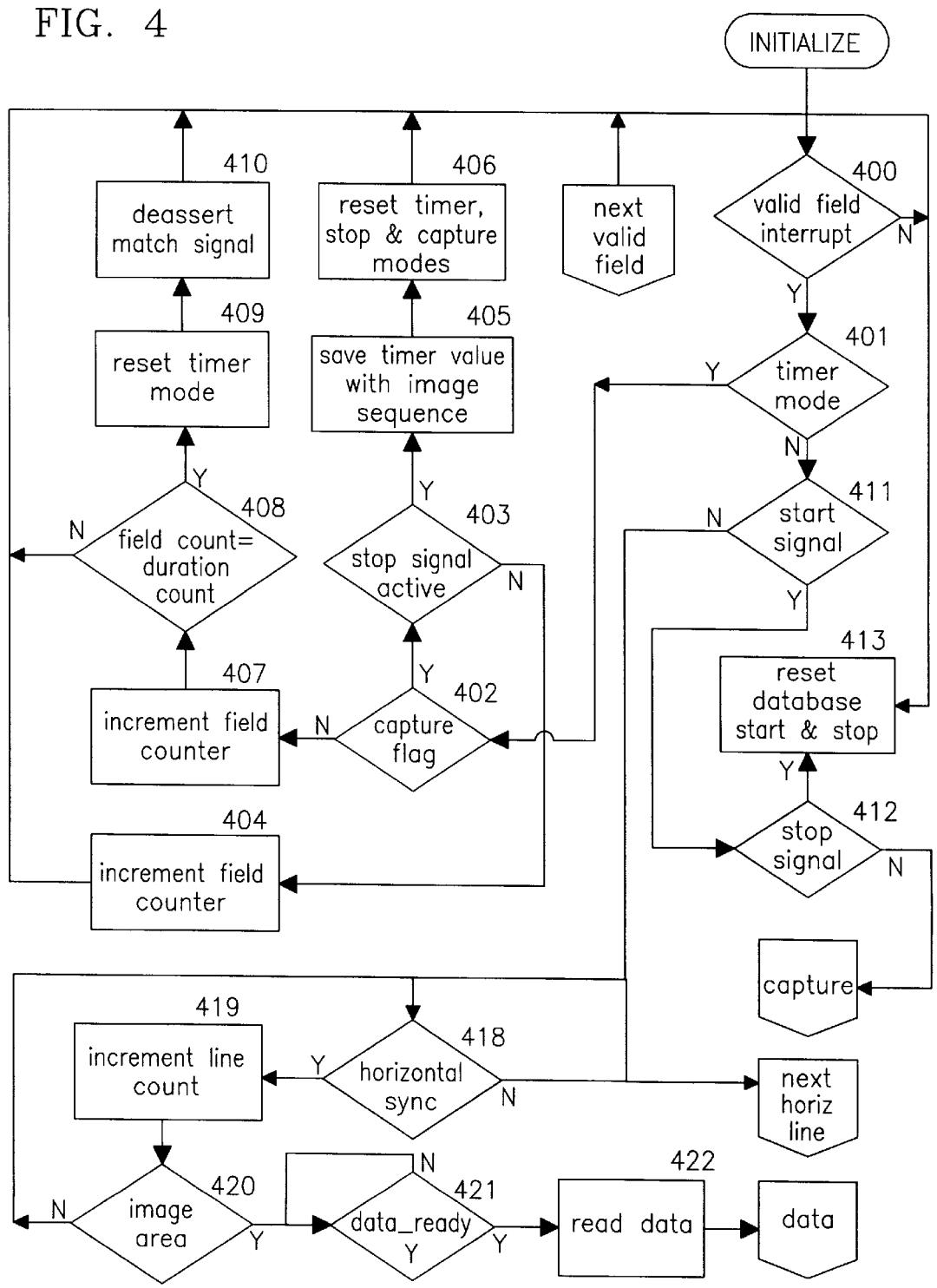
FIG. 4 is a flow chart showing initialization, timer modes, and data acquisition according to the preferred from of the invention.

FIGS. 4, 5, 6, and 7 are flowcharts describing the operation of processor 21. Referring to FIG. 4, during initialization, all pointers and flags used during the operation are put into a consistent state. The processor 21 enters a valid-field interrupt loop awaiting the correct field interrupt signal 400. Only the selected field of the two fields per interlaced image is valid. The processor loops until it receives a valid-field interrupt at step 400. The field interrupt routine examines the timer mode flag at step 401 to determine if the invention is in one of the two timer modes: capture/timer mode or detect/timer mode. If so, the operation is determined by whether the timer mode was initiated by an image capture or detection.

If the capture flag is set at step 402, the operation is in the capture/timer mode and the stop signal (line 15 in FIG. 2) input is read at step 403. If the stop signal is inactive, the count of the number of valid fields occurring since an image was captured is incremented at block 404, and processor 21 returns to the valid-field interrupt loop beginning at decision block 400. The valid-field count is used to time the duration of a video segment.

An active stop signal at step 403 indicates the end of the video segment associated with the most recently captured image. At block 405, the count of the valid fields is appended to the image representation stored in memory. The timer mode flag, capture mode flag, and stop signal are reset at step 406, and processor 21 returns to the top 400 of valid-field interrupt loop.

At decision box 402, if it is determined that the capture flag is not set in the timer mode, processor 21 operates in the detect/timer mode. The detect/timer mode indicates that an image has been detected, and the control signal is being asserted on line 17 in FIG. 2 for the duration stored with the image representation, that is, the stored ordered sequence of image component values. At step 407 processor 21 increments the count of valid fields observed since the image was detected. Step 408 determines whether the count is equal to the number stored with the image representation. If the count is not equal to the number stored with the image representation, processor 21 returns to step 400 at the top of the valid-field interrupt loop. However, if the valid-field count matches the retrieved duration count at step 408, the video segment time has elapsed. The timer mode flag is reset at step 409, and the match signal is de-asserted at 410. Processor 21 then returns to step 400 at the top of the valid-field interrupt loop.

If processor 21 is not in the timer mode at step 401, the start signal input is read. If the start signal is active at decision step 411, the stop signal is read at step 412. In the illustrated implementation, if both the start and stop signals are active, the entire database of image codes is flushed at step 413, typically in preparation for loading a new database. The start and stop signals are also reset at 413, and processor 21 returns to step 400.

Figure 5:
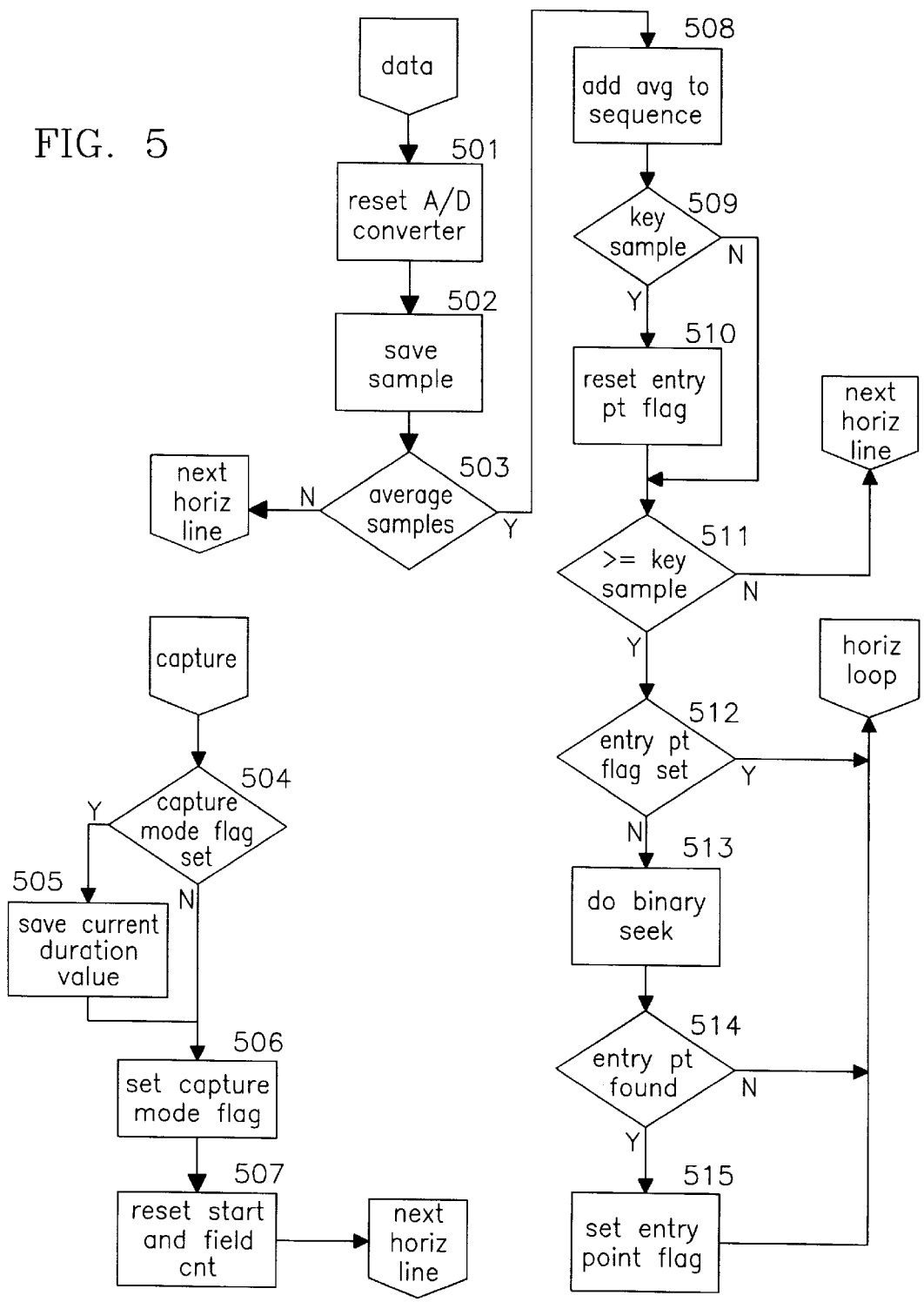
FIG. 5 is a flow chart showing steps of data capture and database search embodying the principles of the invention.

If the start signal is active and the stop signal is inactive at decision step 412, processor 21 checks the capture mode flag at step 504 shown in FIG. 5. Since it is possible that two successive video segments may need to be captured, a start signal occurring when already in the capture mode indicates the start of the next video segment.

If already in the capture mode, the valid-field count for the current segment is saved at step 505 in FIG. 5 along with the most recent image representation. The capture mode flag is set at 506, and the start signal and field count are reset at step 507. Processor 21 enters a horizontal-line loop to process the field.

Each horizontal sync pulse detected at step 418 interrupts processor 21. The processor counts the number of interrupts at step 419 to determine the beginning of the region 64. If step 420 indicates the signal is in region 64, the processor 21 at step 421 enables the data_ready interrupt from the A/D converter to read the quantized data for the line. When the data_ready signal from the A/D interrupts the processor, the data is read at step 422. Until region 64 is reached, as determined by the decision step 420, processor 21 loops counting horizontal sync pulses at step 418.

Once processor 21 is interrupted by and reads the data from the A/D at step 422, the A/D is reset at step 501 in FIG. 5 to enable it to process the next sample. Processor 21 saves the data to a temporary location in memory at step 502.

Since samples represent adjacent lines of video, their values tend to be similar. Because of this, it is feasible to average 2-to-4 lines thereby reducing the storage necessary for the samples. Averaging also reduces the effects of noise which, if random, averages toward zero.

The integration of noise in the video signal itself sums toward zero. The combination of integration and averaging make the invention highly noise tolerant. When the selected number of samples for averaging is collected, processor 21 calculates the average at step 503 in FIG. 5, and saves the average as an image component value in a sequence of values representing the current image. The sequence comprising the image representation may also be referred to as the image signature.

There are nominally 240 lines in region 64. If each four lines are averaged to produce a single value, sixty samples result. This is more samples than are necessary for reliable detection of images. Twenty-four samples will be shown to be sufficient. For 24 samples in the image representation, only 2 out of 5 averaged samples are needed. The time when unused lines are being scanned may be used for other purposes. Used lines are distributed across the region 64.

If a uniform distribution of sample values forming the image representation is assumed, the probability of a specific image representation is one over the total number of image representations possible. The total number of image representations possible is equal to the number of possible values a sample may assume raised to the power of the number of samples. For example, if a sample could take on only three values, and there were two samples, there would be nine image representations possible. If the actual number is sufficiently large that, over a time span of one year, an image representation will statistically occur no more than once, the number of averaged values in an image representation is deemed sufficient.

An image representation is created for each image. At thirty images per second, there are just under one-billion images per year. Therefore, if the total number of possible image representations is over 1 billion, the number of samples utilized is deemed adequate. In fact, since video monitoring takes place much less than 24 hours per day, this number is conservative.

In the invention, averaged values comprising image component values generally fall between 60 and 250. This is because very few video lines are blank which would produce a lower value. This gives a span of values of 190. With a noise margin of ±5, an averaged value will fall into one of 19 possible ranges. Any value in a range will match any other value in the same range. Since there are 19 possible ranges for each value, the probability of a sample being in any given range is $\frac{1}{19}$. The probability of a given sequence of ranges is $\frac{1}{19}$ raised to the power of the number of samples used. Using just eight values make the likelihood of a given image representation approximately 1 in 17 billion.

The image database contains an image representation for each of the captured images. This database is preferably sorted. It is keyed on one of the sample values in an image representation, but preferably not the first value. In televised images, the greatest variation is normally found near the center of the image. This results in a wider variation of values for lines in that region than at the top or bottom. If a sample near the middle of the image is used as a key to sort the image representations, fewer will sort to the same key. For this reason, the invention preferably sorts on the $8^{th}$ of 24 samples.

While data is being acquired for an image representation, the key value will be reached before the end of the sequence of image component values comprising the representation. A binary search of the database is initiated on receiving the key value with one seek occurring on the key and subsequent values. In the capture mode, the search is to locate the position in the database where the sequence comprising the new image representation will be inserted. In the detect mode, the search is for the position of the image representations where the comparisons should begin.

In the detect mode, the targeted location in the database is the ordered sequence (image representation) whose key value is greater than or equal to the current key value minus a noise margin. All image representations within a noise margin of the current key value are valid candidates for comparison. This will generally represent only a small subset of the total a number of image representations. Since the entry point into the database is found before the system produces the complete sequence of image component values comprising an image representation, there is no overhead for the binary search.

Sorting significantly minimizes the time required to do comparisons, and therefore, allows supporting a much larger database of images. It is desirable, however, that the binary search be completed before the end of the sequence of values comprising the image representation. Therefore, there is a correlation between which sample is selected for the key and the total number of samples. The address space to be searched must be searchable in the number of seeks defined by the number of samples remaining after the key is received.

Referring to FIG. 5, after an averaged value is calculated at step 503, the averaged value is added to the end of the current sequence of samples at step 508. If it is determined at step 509 that the sample is the key value for the database, the entry pointer into the database is reset at step 510. If the inquiry at step 511 indicates that the key sample has not been reached yet, operation returns to the horizontal-sync loop beginning at step 418.

If the sample is the key value or one that follows the key at step 511, the entry point flag is checked to see if the entry point has been found yet. At step 512, if the entry point flag is set, the entry point into the database has been found, and the search is finished. However, if the entry point flag is not set, a binary seek is executed at step 513 based on the previous seek results. If this seek results in locating the correct image representation at 514, step 515 is performed to set the entry point flag. Once the key value has been added to the sequence of image component values being produced, each sample is checked at step 601 in FIG. 6 to determine if it is the last sample of the image representation. If not, operation returns to the horizontal-sync loop at step 418. If the sample is the last sample, the sequence is complete and comprises the complete image representation. The sequence must be inserted into the database if in the capture mode, or compared to the database if in the detect mode.

Figure 6:
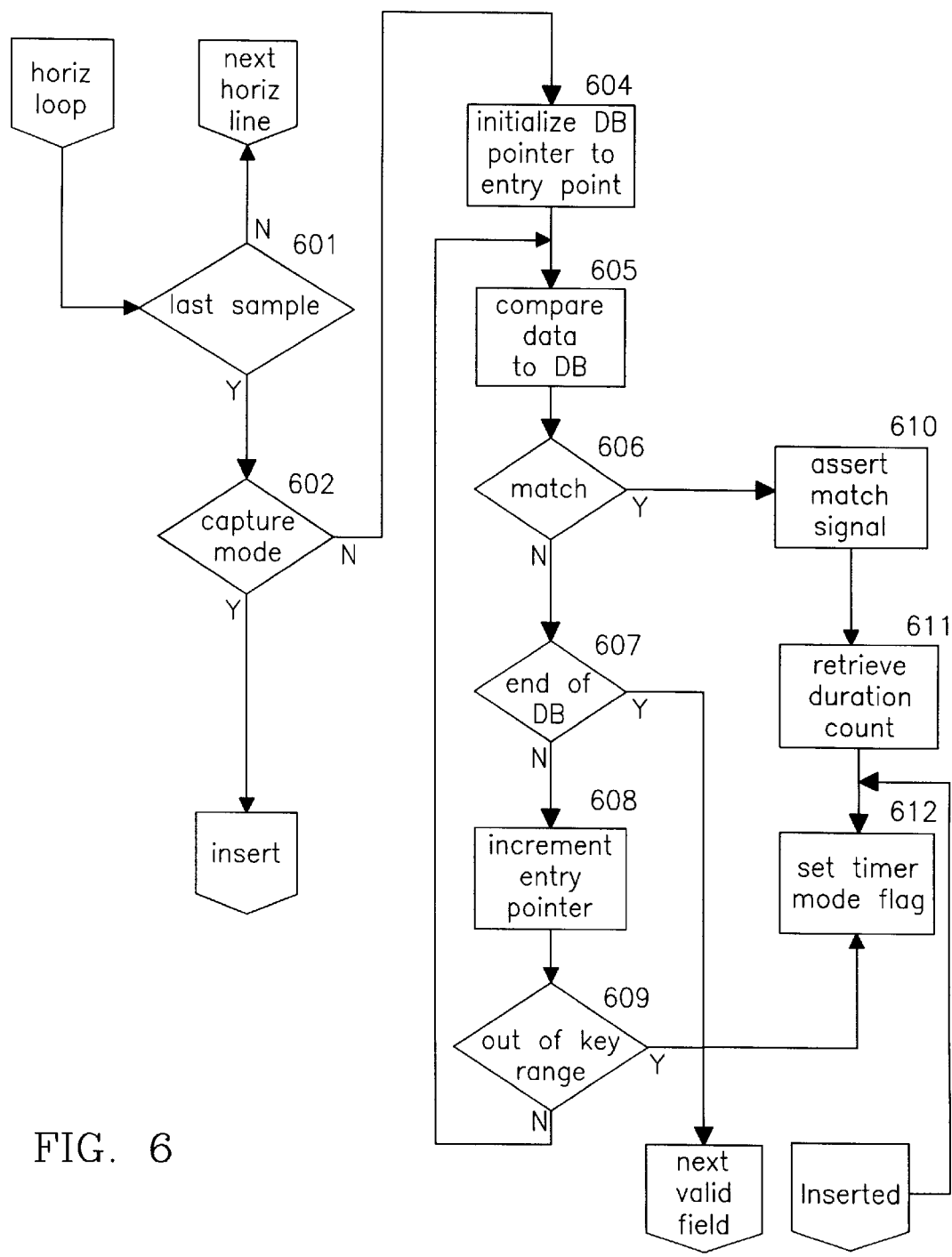
FIG. 6 is a flow chart showing the preferred data comparison steps.

Once the current sequence of values comprising the image representation has been composed as determined at step 601 in FIG. 6, and it is determined at step 602 that the system is in the capture mode, the completed sequence must be inserted into the database. The insertion point is determined by the binary search done during the capturing of the sequence values.

Although sorting the image representations according to key values makes finding a range of image representations much faster, sorting creates a problem when the database is full and a new image representation is to be added. It is desirable to overwrite the oldest image representation in the database. Due to the nature of advertising, there is the highest likelihood that the video segment associated with the oldest image representation will occur the least frequently. If the database were filled in chronological order, keeping track of the oldest entry would be trivial. Sorting eliminates chronological ordering.

To maintain the age of each image representation entered or stored in the database, a sufficient number of bytes are added to each entry to store its order in the database. Two bytes are sufficient for a database of size 65536. A single two-byte number, an order index, is stored with the database to identify the order of the next entry. With each insertion, the order index is incremented. When the order index exceeds the size of the database, its value is set to the number of the first entry. In this manner, the oldest entry in the database can be found.

Figure 7:
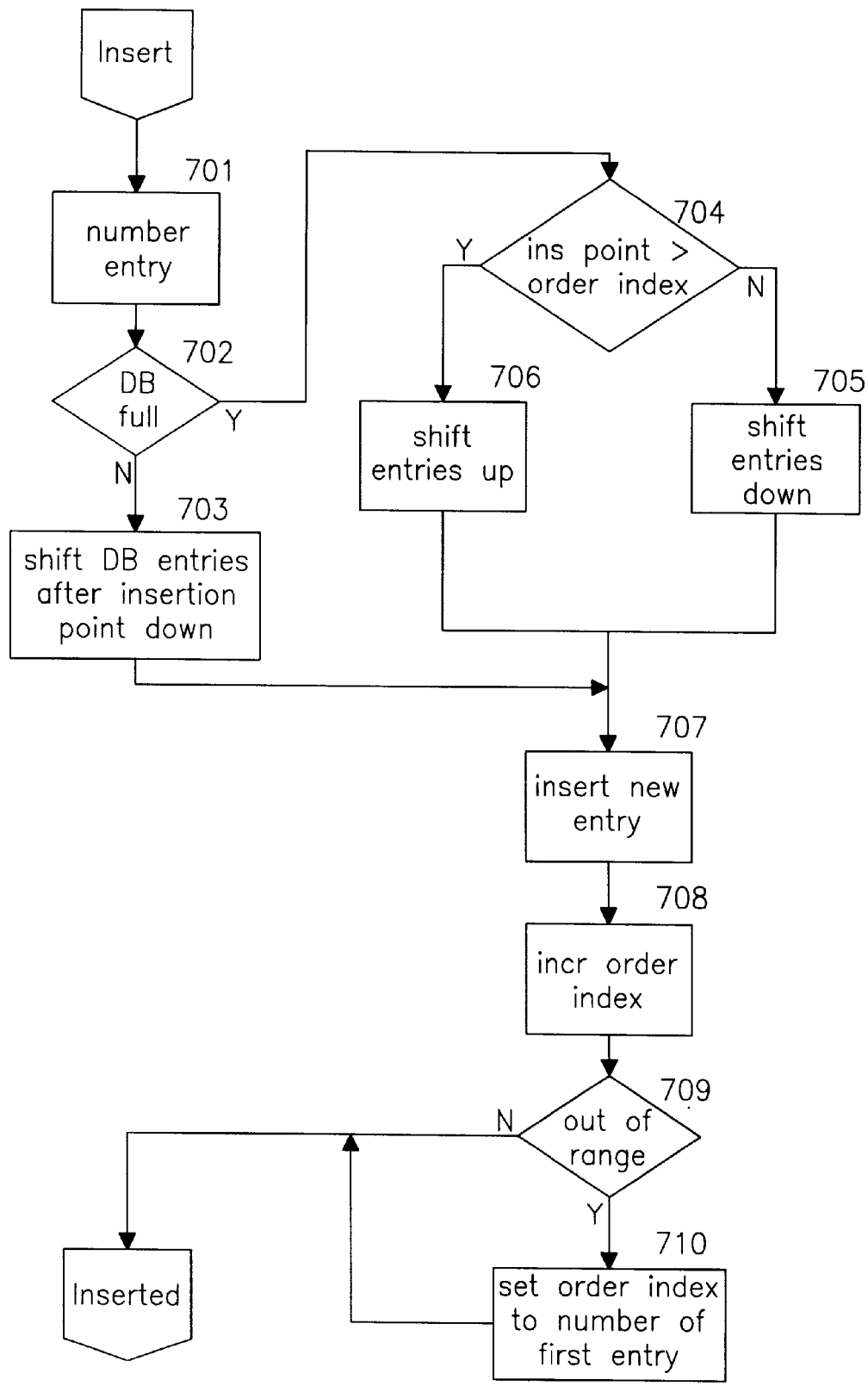
FIG. 7 is a flow chart showing the preferred method for inserting data into the database.

FIG. 7 illustrates the process of inserting entries into the database of image representations according to the invention. When a sequence of values comprising an image representation is complete, the order index is used at step 701 to attach a chronological ordering to the entry. If the database is not full as determined at decision point 702, all sequences from the insertion point to the end of the database are shifted downward at step 703 to make space. At step 707 the new entry is inserted into the space created, and the order index incremented at step 708. If it is determined that the database is full at step 709, the order index is set at step 710 to the number of the first entry in the database. If the database is full at decision point 702, the insertion point calculated from the binary search and the location of the entry with the order index are compared at step 704. The reasoning is that the entry identified by the order index will be over-written. If the insertion point equals the location of the entry with the order index, no shifting of the database is necessary. If the location of the entry with the order index precedes the insertion point, database entries will be shifted upward at step 706 overwriting the order index entry, and making space for the new entry at step 707.

If the location of the entry with the order index follows the insertion point, the database is shifted downwards at step 705 to overwrite the order index entry, and make space for the new entry inserted at step 707. The new entry order number is the same as the entry overwritten. Once the insertion of an entry is complete, the invention enters the timer mode shown at 612 in FIG. 6.

In the detect mode, the current sequence must be compared against the image representations in the database. The comparisons begin at the entry point determined during the sequence capture process at step 604 in FIG. 6. The first entry compared is the entry with a key value greater than or equal to the current key value minus a noise margin. The comparisons continue through the sorted database until the key value in the database exceeds the current key value by greater than a noise margin.

Referring still to FIG. 6, step 605 compares the current sequence (image representation) to the database entry pointed to by the entry pointer. If sequences do not match as indicated at decision step 606, a check is made at step 607 to determine if there are any more database entries. If there are no more database entries, the image has not been captured, and the processor returns to step 400 in FIG. 4.

If step 607 indicates that the entry pointer it is not yet at the end of the database, the entry pointer is incremented at step 608. If step 609 indicates the key value for the image representation now pointed to is greater than a noise margin higher than the key value for the current sequence, there is no match. Processor 21 returns to the top of the valid-field interrupt loop at step 400. Otherwise, a normal comparison of the sequences is made at step 605.

If a match of the current sequence to an image representation is made, the match signal is asserted at step 610. The duration stored with the database sequence is retrieved at step 611, and step 612 sets the timer mode flag. Processor 21 then returns to the top of the valid-field interrupt loop at step 400.

Figure 8:
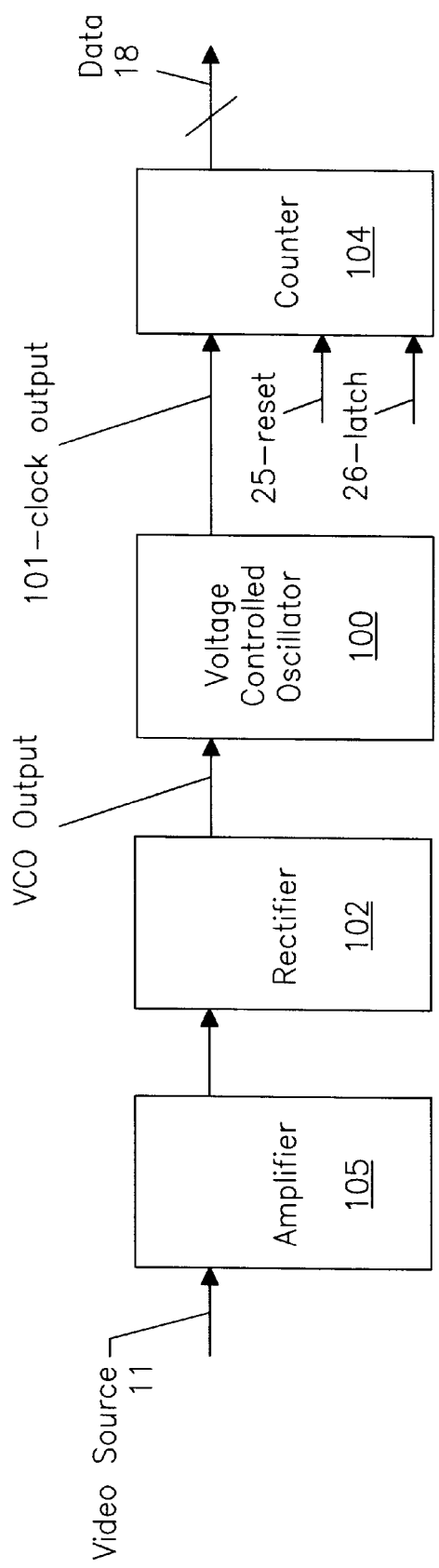
FIG. 8 is a diagrammatic representation of an alternate arrangement for producing image component values according to the invention.

FIG. 8 shows an alternate arrangement for producing an image representation according to the invention. The form of the invention illustrated FIG. 8 uses a voltage controlled oscillator (VCO) 100 instead of an integrator (24 in FIG. 2) to produce a value representative of the image line signal.

The alternate arrangement includes an amplifier 105, rectifier 102, the VCO 100, and a counter 104. Amplifier 105 receives an incoming video signal and amplifies the signal to produce a wider voltage swing. This amplified voltage signal is rectified at rectifier 102 and the rectified voltage signal is applied as the input to VCO 100. VCO 100 produces output pulses at a frequency directly proportional to the input voltage. Thus the number of pulses from VCO 100 over a certain period provides a representation of the voltage signal applied at the VCO input, summed over the given period.

The output of VCO 100 is applied to counter circuit 104 which is adapted to count each VCO pulse. Reset signal 25 to counter 104 holds the counter and delays the start of counting until the active video period 34 shown in FIG. 3A. The trailing edge 46 of latch signal 40, also shown in FIG. 3A, latches the output of counter 104 and also interrupts a processor (not shown in FIG. 8 but similar to processor 21 described with reference to FIG. 2) to prompt the processor to read the counter output on data line 18.

This VCO 100 and counter circuit 104 is to be considered an equivalent of the integrator 24 and A/D converter 22 arrangement shown in FIG. 2. Both arrangements produce a digital value representing the summation of an image line voltage signal over the active video portion of the signal. One advantage of the VCO implementation shown in FIG. 8 is that the VCO is the only critical analog element. Stable fixed-gain amplifiers are easily implemented as are counters such as counter 104. Only the VCO gain must be stabilized. Also, the VCO implementation does not require an analog-to-digital converter. It will be understood that although amplifier 105, rectifier 102, VCO 100, and counter 104 are illustrated as discrete devices, those skilled in the art will appreciate that one or more of the functions provided by these discrete devices may be combined into a single device.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the invention is disclosed above as using substantially the entire image line signal in the active video region, the entire active video signal need not be used. A portion of an image line signal may be summed and used to produce an image component value within the scope of the invention described in the following claims. Also, substantially any set of image line signals in an image may be chosen to produce a sequence of image component values according to the invention.

What is claimed is:

1. An apparatus for creating a representation of an image, the image being produced from an input signal which includes a plurality of image line signals, each image line signal including information for a plurality of points in the image, the apparatus comprising:

(a) an image processing arrangement for receiving a set of image line signals associated with an image and producing from the set of image line signals an ordered sequence of image component values, each image component value in the ordered sequence comprising a value derived from at least one selected image line signal included in the set of image line signals, each ordered sequence of image component values providing a representation of the image with which the set of image line signals is associated; and (b) a storage device for storing the ordered sequence of image component values in response to a capture signal.

2. The apparatus of claim 1 further comprising:

(a) a comparison arrangement for comparing the ordered sequence of image component values with at least one previously stored ordered sequence of image component values stored in the storage device, at least one previously stored ordered sequence of image component values having been produced from a set of image line signals which have previously been received by the image processing arrangement.

3. The apparatus of claim 2 wherein the image comparison arrangement includes:

(a) a sorting device for sorting each stored ordered sequence of image component values according to a common segment of image component values.

4. The apparatus of claim 2:

(a) wherein the image processing arrangement includes a counter for producing a duration value representing the duration of a segment of the input signal, the duration being the time of the segment occurring after the ordered sequence of image component values which is stored in response to the capture signal;

(b) wherein the storage device is also for storing the duration value; and (c) further comprising a control signal device for generating a control signal in response to a match between the ordered sequence of image component values and a stored ordered sequence of image component values.

5. The apparatus of claim 1 wherein the image processing arrangement includes:

(a) an averaging device for averaging at least two of the selected image line signals to produce one of the image component values in the ordered sequence of image component values.

6. The apparatus of claim 1 wherein each image line signal comprises a signal for a line of a rasterized image, and the signal processing arrangement includes:

(a) a circuit for summing each image line signal in the received set of image line signals to produce a summed signal; and (b) an analog-to-digital converter for converting each summed signal to a digital representation and wherein each image component value in the ordered sequence of image component values comprises a digital value.

7. The apparatus of claim 6 further comprising:

(a) a timing control system for detecting a horizontal sync signal within the input signal and controlling the operation of the analog-to-digital converter using the received horizontal sync signal.

8. A method for creating a representation of an image, the image being produced from an input signal which includes a plurality of image line signals, each image line signal including information for a plurality of points in the image, the method comprising the steps of:

(a) receiving a set of image line signals, the set of image line signals being associated with the image;

(b) producing a plurality of image component values, each image component value comprising a value derived from at least one selected image line signal included in the set of image line signals; and (c) arranging the plurality of image component values into an ordered sequence, the ordered sequence of image component values providing a representation of the image with which the set of image line signals is associated.

9. The method of claim 8 further comprising the step of:

(a) storing the ordered sequence of image component values in response to a capture signal.

10. The method of claim 8 further comprising the step of:

(a) comparing the ordered sequence of image component values with at least one stored ordered sequence of image component values.

11. The method of claim 10 wherein the step of comparing the ordered sequence of image component values with at least one stored ordered sequence of image component values includes the step of:

(a) sorting each stored ordered sequence of image component values by a common segment of image component values in the respective ordered sequence.

12. The method of claim 9 including the step of:

(a) producing a control signal for an input signal duration in response to a match between the ordered sequence of image component values and a stored ordered sequence of image component values.

13. The method of claim 9 further comprising step of:

(a) producing a duration value representing a duration of a segment of the input signal, the duration being the time of that portion of the segment occurring after the ordered sequence of image component values which is stored in response to the capture signal.

14. The method of claim 8 further comprising the step of:

(a) averaging at least two of the selected image line signals to produce one of the image component values in the ordered sequence of image component values.

15. The method of claim 8 wherein each image line signal comprises a signal for line of a rasterized image, and further comprising the steps of:

(a) summing each image line signal to produce a summed signal; and (b) converting each summed signal to a digital representation.

16. The method of claim 15, further comprising the step of:

(a) detecting a horizontal sync signal within the input signal and using the received horizontal sync signal to control the conversion of the summed signal to the digital representation.

17. An apparatus for detecting an image, the image being produced from an input signal which includes a plurality of image line signals, each image line signal including information for a plurality of points in the image, the apparatus comprising:

(a) an image processing arrangement for receiving a set of image line signals associated with an image and producing from the set of image line signals an ordered sequence of image component values, each image component value in the ordered sequence comprising a value derived from at least one selected image line signal included in the set of image line signals, each ordered sequence of image component values providing a representation of the image with which the set of image line signals is associated;

(b) a storage device for storing at least one captured ordered sequence of image component values; and (c) a comparison arrangement for comparing the ordered sequence of image component values with at least one captured ordered sequence of image component values stored in the storage device to determine if the ordered sequence of image component values matches any captured sequence of image component values.

18. The apparatus of claim 17 wherein the image processing arrangement includes:

(a) an averaging device for averaging at least two of the selected image line signals to produce one of the image component values in the ordered sequence of image component values.

19. The apparatus of claim 17 wherein the image comparison arrangement includes:

(a) a sorting device for sorting each stored ordered sequence of image component values according to a common segment of image component values.

20. The apparatus of claim 17 wherein each image line signal comprises a signal for a line of a rasterized image, and the signal processing arrangement includes:

(a) a circuit for summing each image line signal in the received set of image line signals to produce a summed signal for each image line signal; and (b) an analog-to-digital converter for converting each summed signal to a digital representation.

* * * * *